Sept. 12, 1967    B. L. GODBERSEN    3,340,936
HARROW ATTACHMENT BREAK-AWAY CONNECTION
Filed April 20, 1965    2 Sheets-Sheet 1
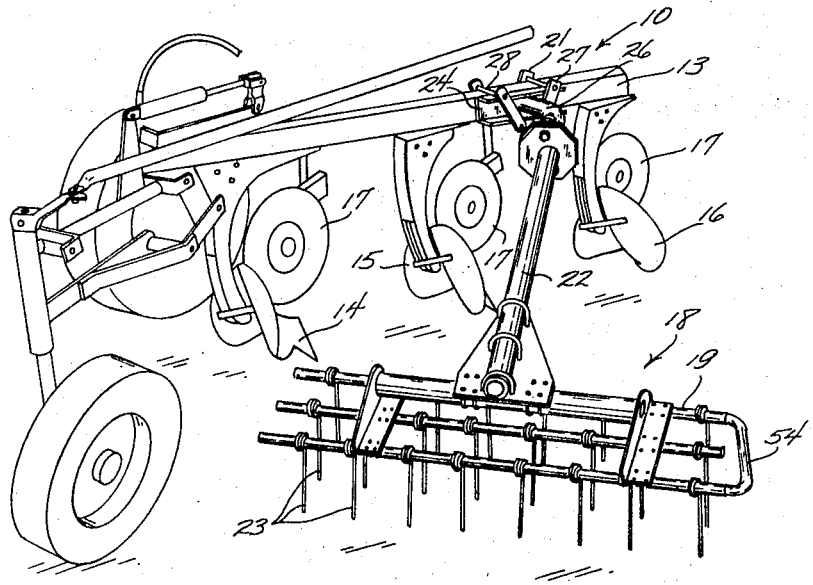
Fig. 1
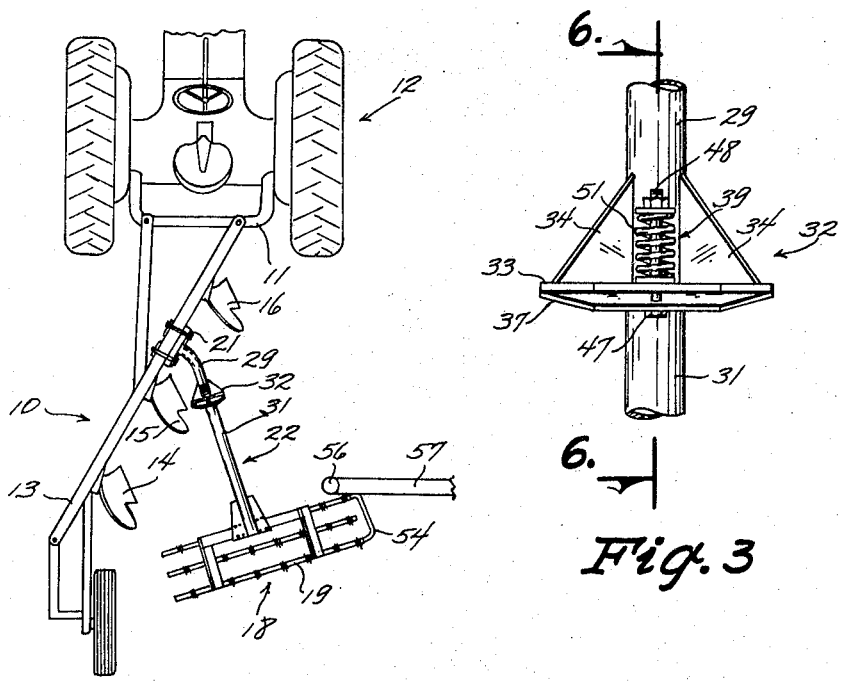
Fig. 2
Fig. 3
INVENTOR
BYRON L. GODBERSEN
BY
Robert Henderson
ATTORNEY Sept. 12, 1967   B. L. GODBERSEN   3,340,936
HARROW ATTACHMENT BREAK-AWAY CONNECTION Filed April 20, 1965   2 Sheets-Sheet 2

INVENTOR
BYRON L. GODBERSEN
BY
W. Robert Henderson
ATTORNEY

United States Patent Office 3,340,936
Patented Sept. 12, 1967

3,340,936
HARROW ATTACHMENT BREAK-AWAY
CONNECTION
Byron L. Godbersen, Ida Grove, Iowa 51445
Filed Apr. 20, 1965, Ser. No. 449,543
3 Claims. (Cl. 172—202)

ABSTRACT OF THE DISCLOSURE

The present invention discloses a resilient connection between the frame of a prime mover, such as a plow frame, and a harrow, with the connection extended rearwardly from the plow frame at an angle relative to the direction of movement of the plow frame rather than aligned or parallel to the direction. Upon movement of the apparatus over uneven terrain, the offset nature of the connection limits the inclination of the harrow over the ground as compared to the inclination of the plow frame.

---

This invention relates generally to harrow attachments for plows, and specifically to a break-away connection for the harrow attachment.

One disadvantage of the plow mounted harrow is its susceptibleness to catching on a fence post or other obstructions when transporting the harrow from field to field. Another disadvantage is the stationary, non-give connection of the harrow to the plow beam. To overcoming such disadvantages as these, and to providing other features described hereinafter, the present invention is directed.

It is an object of this invention to provide an improved harrow attachment.

It is another object of this invention to provide a novel apparatus for flexibly and resiliently attaching a harrow to a plow.

It is yet another object of this invention to provide a connection apparatus for a harrow attachment whereby the harrow will break away and swing away from an obstacle upon which it has caught during movement of the plow.

Still another object of this invention is the provision of a connection apparatus for a harrow attachment which acts as a shock absorber when the harrow is in actual use.

Yet another object is an apparatus for flexibly connecting a pair of separated shafts and resiliently maintaining the shafts in longitudinal alignment while permitting them relative movement.

These objects, and other features and advantages of this invention will become readily apparent upon reference to the following description when taken in conjunction with the accompanying drawings, wherein:

FIG. 1 is a perspective view of the harrow attachment of this invention, shown connected to a plow beam;

FIG. 2 is a reduced plan view showing the harrow caught on a fence post;

FIG. 3 is an enlarged plan view of the resilient connection of this invention, shown in the position of FIG. 2;

Figure 4:
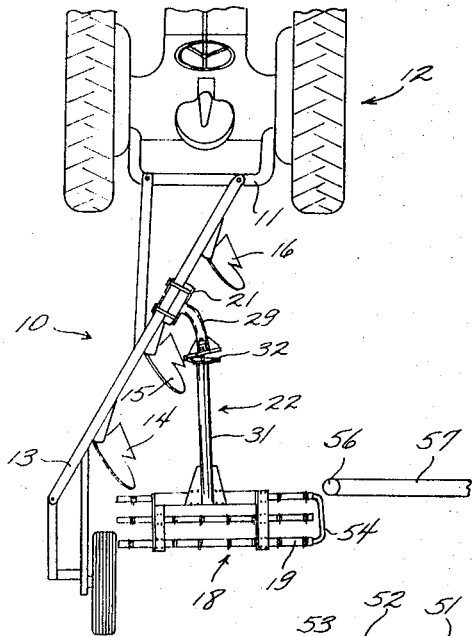
FIG. 4 is a reduced plan view similar to FIG. 2, and wherein the harrow has broken away from the fence post, due to the resilient connection.

Referring now to the drawings and particularly to FIG. 1, a trailing-type moldboard plow is indicated generally at 10 connected to the draw bar 11 of a tractor 12. The plow is a three bottom plow having a beam 13 provided with the bottoms 14, 15, and 16, and the beam 13 also having three rolling coulters 17 mounted thereon.

The harrow attachment of this invention is indicated generally at 18 in FIGS. 1 and 2, and comprises basically the harrow 19, a mounting bracket 21, and a shaft unit 22 for resiliently connecting the harrow 19 to the bracket 21.

In this instance the harrow 19 is a spring tooth type harrow wherein the spring teeth, indicated at 23 in FIG. 1, are pivotally mounted for yieldable engagement with the soil. The invention is not, however, limited to a particular harrow, nor is it limited to use with a particular plow 10.

Figure 9:
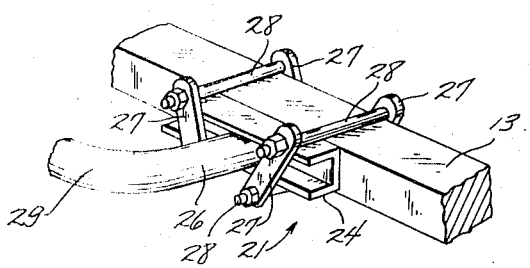
FIG. 9 is a fragmentary perspective view of the mounting bracket for the harrow attachment.

The mounting bracket 21 is best shown in FIG. 9 and includes a U-shaped beam 24 to which one end 26 of the shaft unit 22 is connected, as by welding. The beam 24 is shown held against a side of the plow beam 13 by a quartet of bars 27, two of which are against the exposed side of the beam 24 and the other two of which are held against the opposite side of the plow beam 13. The bars 27 are interconnected over and under the beams 13 and 24 by a quartet of connecting bolts 28. Again, the invention of the resilient shaft unit 22 is not limited to a particular mounting bracket 21.

The shaft unit 22 comprises an inner curved shaft portion 29 (FIG. 2), an outer straight shaft portion 31, and a resilient connection 32 attached to and movably biasing said portions 29 and 31 together so as to form and maintain them axially aligned (FIG. 3) as an integral shaft.

Figure 5:
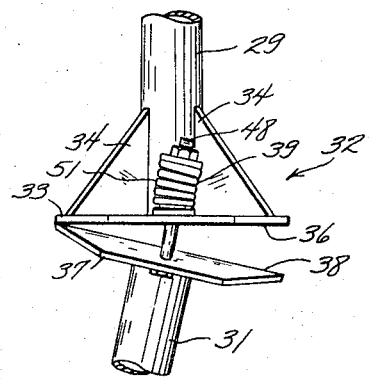
FIG. 5 is an enlarged view similar to FIG. 3, and showing the resilient connection according to the FIG. 4 relation of parts.
Figure 8:
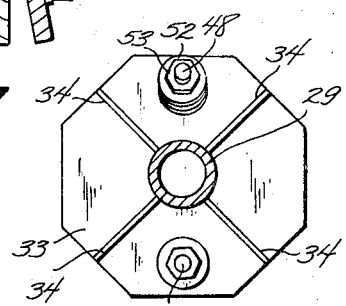
FIG. 8 is a sectional view taken along the line 8—8 in FIG. 6.

The inner portion 29 is connected to the mounting bracket 21 at the end 26, and has a flat, octagonal shaped plate 33 (FIGS. 6 and 8) secured at its other end, as by a quartet of gussets 34. The face 36 (FIG. 5) of the plate 33 is flat, the plate 33 extends at right angles to the longitudinal axis of the inner portion 29, and the latter is secured to the exact center of the plate 33 (see FIG. 8).

Similarly, the outer portion 31 is connected at one end to the harrow 19, and has a plate 37 (FIGS. 5 and 6) secured to its other end. The plate 37 is gradually semi-circularly curved, as illustrated, in the vertical plane, but is straight across in all horizontal planes, so to speak. From the rear, the plate 37 has an octagonal shape identical to that of the plate 33. As with the plate 33, the plate 37 extends laterally substantially at right angles with the outer portion 31 (FIG. 3), and the latter is secured to the exact center of the plate 37.

Figure 6:
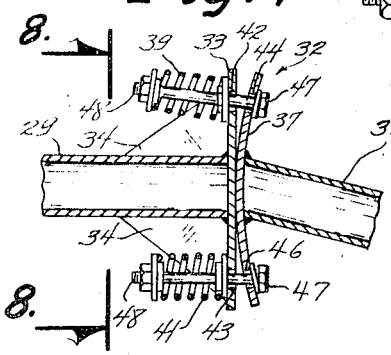
FIG. 6 is a sectional view taken along the line 6—6 in FIG. 3.

As shown in FIGS. 3 and 6, a full line contact of the plates 33 and 37 is maintained on a horizontal axis transversely across their center portions. The horizontal axis contact, aligned with the longitudinal axis of the shaft portions 29 and 31 is considered a minimum requirement for the practice of the invention. To maintain the face contact of the plates 33 and 37, and the longitudinal and axial alignment of the shaft portions 29 and 31, the resilient connection 32 is provided.

This connection 32 comprises a pair of resilient connectors 39 and 41 (FIG. 6). To provide for the connectors, each plate 33 and 37 has a pair of apertures 42 and 43, and 44 and 46, respectively, formed in vertically spaced relation directly above and below the connection of the particular shaft portion with the plate. Upon horizontal alignment of each pair of apertures 42 and 44, and 43 and 46 of the plates, a bolt 47 of each connector 39 and 41 can be passed therethrough. As each connector is identical, only one will be described.

Figure 7:
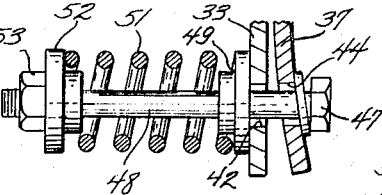
FIG. 7 is an enlarged detail of FIG. 6.

Referring to FIG. 7, the stem 48 of the bolt 47 is inserted through the aligned apertures. Embracing the stem 48 and held next to the adjacent plate 33 is a guide washer 49, then is placed a compression spring 51, another guide washer 52 facing the washer 49, and a locking nut 53. It can readily be seen that either or both connectors 39 and 41 (FIG. 6) are individually adjustable as regards the compression of the spring 51.

In use, referring to FIG. 2, an end closure member 54 of the harrow 18 is shown hooking against the post 56 of fence 57. Were the shaft unit 22 stationary and of a non break-away type, it can readily be seen that damage either to the harrow 18 or to the fence 57 would occur upon continued forward movement of the tractor 12. However, due to the shaft unit 22, the plate 33 of the outer shaft portion 31 fulcrumming against the plate 37 of the inner shaft portion 29 (FIGS. 4 and 5), the outer portion 31 and the harrow 18 swing horizontally in a clockwise direction as viewed in FIG. 4.

Thus, the harrow 18 is permitted to break away from the plow beam 13 to swing past the fence post 56. When completely past the post, the compression of the springs 51 will then bias the plates 33 and 37 back into their original face-to-face relationship (FIGS. 2 and 3), whereby the shaft portions 29 and 31 again become axially aligned.

As important a use, the operator can quickly and easily make working pressure adjustments on the harrow 18. Thus, should it be desired to have the harrow raised slightly to lift the spring teeth 23 to a slightly higher position, the operator need merely tighten down the nut 53 for the upper connector 39 to increase the compression of the spring 51, while loosening the nut 53 for the lower connector 41 if necessary. This will rock the curved plate 37 in a clockwise direction (FIG. 6) about its horizontal contact with the plate 33, thus raising the outer shaft portion 31 more toward the horizontal. Conversely, a tightening of the lower connector unit 53 and if necessary, a loosening of the upper connector unit 39 (FIG. 4) would cause the harrow 19 to drop further down to increase the working pressure of the spring teeth 23.

Yet another advantage of the harrow attachment 18 of this invention, is its capability of retaining substantially a level position relative to the soil level, regardless of a slight tilt of the plow beam 13. The advantage is obtained by the shaft unit 22 extending away from the longitudinal axis of the plow beam at approximately a 45° angle. Thus, should the plow beam tilt slightly one way or another away from a horizontal plane, due for example to a slope of the ground surface, the attachment 18 reacts such that the end of the harrow 18 nearest the beam 13 does not change its height perceptibly, and with the opposite end changing its height above the ground surface approximately but one-half the amount of tilt of the plow beam.

Although a preferred embodiment of this invention has been disclosed and described herein, it is to be remembered that various modifications and alternate constructions can be made thereto without departing from the true spirit and scope of the invention as defined in the appended claims.

I claim:

1. An attachment for connecting a harrow in towing relation to a plow frame, the frame having a plow beam extended rearward to one side of and at an angle to the direction of movement of the plow frame, the attachment comprising:
    a first member secured to the plow frame;
    a second member secured to the harrow and movable in a horizontal plane relative to said first member; and
    resilient, hinged means connecting said members together to form a shaft unit, said hinged means at a location intermediate the ends of said shaft unit, and biasing said members to maintain said members against relative movement, and permitting said second member to swing in a horizontal plane relative to said first member,
    said connecting means normally maintaining said second member at an angle relative to the direction of movement of the plow frame.

2. An attachment as defined in claim 1, and further wherein said second member extends at an angle to the other side of the direction of movement of the plow frame.

3. An attachment as defined in claim 2, and further wherein said connecting means connects adjacent ends of said members such that adjacent portions of said members have a common axis.

References Cited

UNITED STATES PATENTS

| | | | |
|---|---|---|---|
| 907,505 | 12/1908 | Kaufmann et al. | 172—202 |
| 974,377 | 11/1910 | Hatlelid | 172—202 |
| 1,596,838 | 8/1926 | Houser | 172—202 X |
| 1,610,180 | 12/1926 | Thomson. | |
| 1,777,487 | 10/1930 | Goodwill | 172—678 X |
| 2,564,041 | 8/1951 | Vogel | 287—99 |
| 2,634,986 | 4/1953 | McDaniel | 280—489 |
| 2,723,134 | 11/1955 | Antes | 280—488 |
| 2,923,364 | 2/1960 | King et al. | 280—489 X |

ABRAHAM G. STONE, *Primary Examiner.*

R. CARTER, A. E. KOPECKI, *Assistant Examiners.*